Nov. 26, 1963  A. JOHNSON  3,111,704
DOOR HINGE WITH FRICTION TYPE HOLD-OPEN MEANS
Filed Sept. 22, 1961
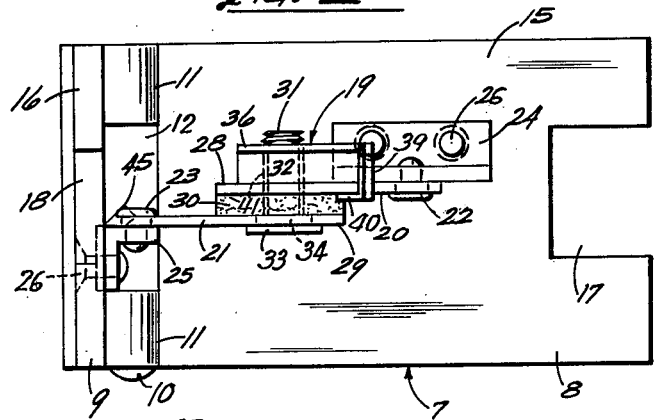
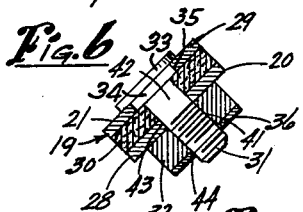
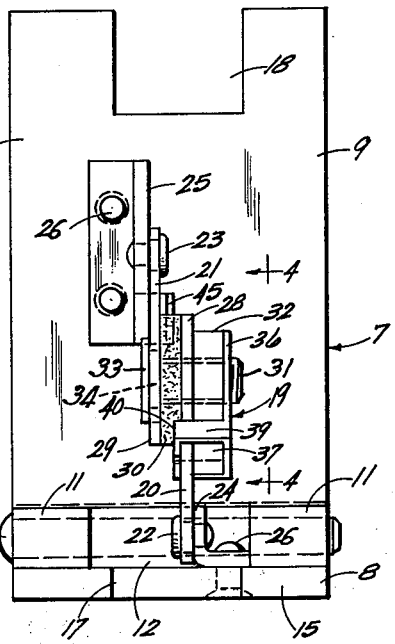
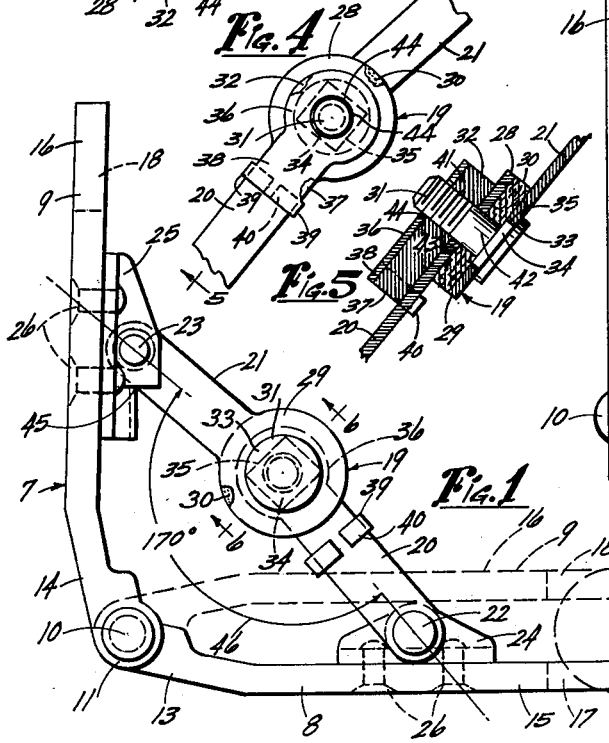
INVENTOR
AGNAR JOHNSON, DEC'D
by assignee's agent,
Andrew F. Wintercorn
ATTY.

3,111,704
DOOR HINGE WITH FRICTION TYPE HOLD-OPEN MEANS

Agnar Johnson, deceased, late of Rockford, Ill., by Oliver Nelson, administrator, Rockford, Ill., assignor to Atwood Vacuum Machine Company, Rockford, Ill., a corporation of Illinois
Filed Sept. 22, 1961, Ser. No. 155,522
4 Claims. (Cl. 16—138)

This invention relates to automobile door hinges and is more particularly concerned with improvements in friction type hold-open means therefor.

The principal object of the invention is to provide a simple, economical, and thoroughly practical friction type hold-open means for a butt type hinge operating on a screw tightening principle, the two halves of the butt hinge being interconnected by a pair of toggle links which have incorporated in their pivotal connection a screw on the one link, that is held against turning with respect thereto and provides the pivot for the other link on which the nut threading on the screw is mounted in a suitable cage and held against turning, a friction washer mounted on the screw being subject to compression between the pivotally connected overlapping ends of the toggle links to provide gradually increasing frictional resistance to the relative movement of the links as they come nearer and nearer to a dead-center relationship, a stop being provided for positively limiting the opening movement of the hinge members so that they cannot reach a 180° position. The pivotally connected ends of the links are of enlarged circular form matching the form and diameter of the friction washer, the enlarged diameter of the washer and the braking surfaces provided therefor on the overlapping ends of the links affording the desired friction area so that the unit pressure for a given braking action can be kept to a reasonably low figure and wear on the friction washer can be kept low enough to insure good life and good functioning throughout that life, the two hinge members being cut away to provide operating clearance for the enlarged end portions of the links and the friction washer therebetween, these parts being of the maximum diameter possible within the over-all thickness of the hinge at the outer ends of the members thereof where the members are cut away to provide clearance, as mentioned.

The inventon is illustrated in the accompanying drawing, in which—

FIG. 1 is a plan view of a butt type automobile door hinge equipped with friction type hold-open means made in accordance with the invention;

FIG. 2 is a side view of FIG. 1;

FIG. 3 is a front view of FIG. 1;

FIG. 4 is a detail on the line 4—4 of FIG. 3;

FIG. 5 is a section on the line 5—5 of FIG. 4, and

FIG. 6 is a section on the line 6—6 of FIG. 1.

The same reference numerals are applied to corresponding parts throughout these views.

Referring to the drawing, the automobile door hinge indicated generally by the reference numeral 7 is of the well known butt type comprising hinge members 8 and 9 pivotally connected by means of a pintle 10 entered through two spaced knuckles 11 on the end of one member and through another knuckle 12 provided on the end of the other member, the pintle having a drive fit in the knuckles 11 and a close working fit in the knuckle 12, so that there is no likelihood of the pintle coming out. The butt hinge shown is of fairly conventional design having the pintle receiving knuckle end portions 13 and 14 offset as shown, so that when the door on which the hinge 7 is mounted is closed, the attaching end portions 15 and 16 of the members 8 and 9, one of which is secured to the door and the other to the pillar on the body, are disposed in spaced substantially parallel relationship as indicated by the dotted line position of member 9 in FIG. 1. The only necessary departure from conventional design and construction with the present invention is the provision of clearance notches 17 and 18 in the outer ends of the attaching portions 15 and 16 to provide operating clearance for the friction type hold-open means indicated generally by the reference numeral 19 assembled on the pivotally connected inner ends of toggle links 20 and 21, the other ends of which are pivotally connected, as at 22 and 23, to the attaching end portions 15 and 16 of hinge members 8 and 9, respectively, by means of brackets 24 and 25 riveted, as indicated at 26, to the inner side of the aforesaid attaching shank portions. The over-all diameter of the hold-open means 19 at the pivotally connected ends of links 20 and 21 approximately equals the thickness dimension 27 at the inner ends of the attaching shank portions 15 and 16 in the closed position of the door, as shown in FIG. 1, notches 17 and 18 providing operating clearance for this hold-open means.

Toggle links 20 and 21 have radially enlarged circular inner end portions 28 and 29, respectively, and these enlarged circular inner end portions are disposed in concentric overlapping relationship with a circular friction washer 30 of brake lining material and of the same diameter as portions 28 and 29 disposed therebetween and adapted to be compressed as portions 28 and 29 are drawn together by the tightening of a screw 31 in a nut 32 in the opening of the hinge with the opening of the door. The screw 31 has a head 33 and a square shank portion 34 next ot the head received in a square hole 35 provided in the outer end of link 21, whereby to turn the screw 31 with the link 21 in a tightening direction as the hinge opens, and vice versa in the closing of the hinge. The nut 32, on the other hand, is retained by means of a sheet metal cage 36 on the inner end of the other link 20, the nut 32 having a radially extending arm 37 under a radial extension 38 of the cage 36 to facilitate locking the nut against turning with respect to the link 20, lugs 39 provided on the opposite sides of the extension 38 extending at right angles to the plane of the cage 36 and having their free end portions bent inwardly behind the link 20 as indicated at 40 to clinch the cage and nut in place on the inner end of the link. The screw 31 threads in the hole 41 in the nut 32, but has a smooth shank portion 42 next to the square shank portion 34 which has a close pivotal fit in the hole 43 in the inner end of the link 20 to provide the pivotal connection between links 20 and 21, the threaded end portion of the screw that extends beyond the nut 32 extending freely through a hole 44 in the cage 36. The threads on screw 31 provide for a predetermined compression of friction washer 30 in approximately 170° travel, or slightly less than one-half turn of the screw, for the desired tightness of friction hold-open action in the fully opened position of the door, and, of course, with the links 20 and 21 so near to a dead-center relationship the mechanical advantage of the hold-open means increases the closer the links come to dead-center. A stop is indicated at 45 for positively limiting the pivotal movement of link 21 when the links 20 and 21 reach the 170° position indicated by the arc 46 in FIG. 1, this stop being provided by a lug bent at 45° from one end of the flange of bracket 25. While the screw and nut means 31—32 shown is preferred because it offers the advantage of close uniformity in quantity production, plus the further advantage that one may easily compensate for wear by unlocking and removing the cage 36 and either tightening the nut 32 through 180°, if that amount of take-up is necessary, or loosening the nut enough to permit resetting the screw 31 forward a quarter turn before replacing the cage 36, it is realized that a variable pitch ramp and follower operating in otherwise the same manner as the screw and nut could be used.

In operation, when the door is closed, the hinge members 8 and 9 have their attaching shank portions 15 and 16 disposed in parallel relationship, as indicated by the dotted line position of hinge member 9 in FIG. 1, and the friction type hold-open means 19, the largest diameter portion of which is represented by the washer 30 and overlapping end portions 28 and 29 of links 20 and 21, has ample operating clearance in the notches 17 and 18 in the inner end portions of the hinge members, as indicated by the dotted circle in FIG. 1. When the door is opened to about the half-way open position, which is true in a large percentage of door operations, as when opening the door of the car in a garage or in the vicinity of some other car in a parking lot, the friction drag obtained by the partial compression of the friction washer 30 is enough to insure holding the door open well enough even if there is a certain amount of inclination of the car that might tend to cause the door to swing closed by gravity. On the other hand, the friction hold-open action at that point is not nearly as appreciable as in the fully opened position of the door and consequently the operator with this friction type hold-open means finds that he has much greater freedom of operation of the door than with hold-open means of other types which take hold definitely at a given point and necessitate the operator pulling hard enough on the door to overcome the perceptible resistance to movement when it is desired to close the door, a similar exertion in pushing the door to overcome the detent action of the hold-open means being necessary if the operator wants to swing the door farther open. The friction hold of the hold-open means 19 greatly increases, of course, as the links 20 and 21 approach the nearly flat angle of 170° indicated at 46 in FIG. 1, the mechanical advantage of the friction type hold-open means 19 increasing the closer this limit position is approached, so that there is very little likelihood of a sudden gust of wind causing the door to slam shut accidentally and yet the operator does not find it too much of a strain to swing the door closed, not as much as with some other types of hold-open means where there is a pronounced and semipositive detent action at the fully open position of the door, some of these being actually designed too much with the strength of a man driver in mind, in which event the average woman driver has some difficulty in overcoming the resistance to door movement.

It is believed the foregoing description conveys a good understanding of the objects and advantages of the invention. The appended claims have been drawn to cover all legitimate modifications and adaptations.

What is claimed is:

1. In a hinge comprising two generally rectangular butt members, and a pintle pivotally connecting the same at their one end, hold-open means for said hinge comprising a pair of toggle links having overlapping flat end portions in spaced parallel relationship, means pivotally connecting the other end of said links to the respective butt members intermediate their ends on axes parallel to said pintle, a screw carried on one of said overlapping end portions and having a head and a smooth cylindrical shank portion, the latter extending through and bearing in a circular hole provided in the other of said overlapping end portions for pivotally connecting said end portions, means holding said screw against turning relative to the link carrying it, said shank having a threaded outer end portion, a nut threaded thereon and fixed on the other of said links against turning relative thereto, whereby said overlapping end portions are drawn together by the tightening of said nut as said links are swung from folded position toward dead-center relationship in the opening of said hinge, and friction brake material compressible between the overlapping end portions of said links in the tightening of said nut to give increasing resistance to relative motion of said links the closer the same approach dead-center relationship, the nut having a radial extension serving as a lever arm, said nut being fixed against turning by means of said extension to the link carrying said nut.

2. In a hinge comprising two generally rectangular butt members, and a pintle pivotally connecting the same at their one end, hold-open means for said hinge comprising a pair of toggle links having overlapping flat end portions in spaced parallel relationship, means pivotally connecting the other end of said links to the respective butt members intermediate their ends on axes parallel to said pintle, a screw carried on one of said overlapping end portions and having a head and a smooth cylindrical shank portion, the latter extending through and bearing in a circular hole provided in the other of said overlapping end portions for pivotally connecting said end portions, means holding said screw against turning relative to the link carrying it, said shank having a threaded outer end portion, a nut threaded thereon and fixed on the other of said links against turning relative thereto, whereby said overlapping end portions are drawn together by the tightening of said nut as said links are swung from folded position toward dead-center relationship in the opening of said hinge, and friction brake material compressible between the overlapping end portions of said links in the tightening of said nut to give increasing resistance to relative motion of said links the closer the same approach dead-center relationship, the nut having a radial extension serving as a lever arm, said nut being fixed against turning by means of said extension to the link carrying said nut, the construction including an elongated cage for the nut, one end portion of which has the threaded outer end portion of the screw extending freely through an opening provided therein, and the other end portion of which is fixed with the nut extension to the link carrying said nut.

3. In a hinge comprising two generally rectangular butt members, and a pintle pivotally connecting the same at their one end, hold-open means for said hinge comprising a pair of toggle links having overlapping flat end portions in spaced parallel relationship, means pivotally connecting the other end of said links to the respective butt members intermediate their ends on axes parallel to said pintle, a screw carried on one of said overlapping end portions and having a head and a smooth cylindrical shank portion, the latter extending through and bearing in a circular hole provided in the other of said overlapping end portions for pivotally connecting said end portions, means holding said screw against turning relative to the link carrying it, said shank having a threaded outer end portion, a nut threaded thereon and fixed on the other of said links against turning relative thereto, whereby said overlapping end portions are drawn together by the tightening of said nut as said links are swung from folded position toward dead-center relationship in the opening of said hinge, and friction brake material compressible between the overlapping end portions of said links in the tightening of said nut to give increasing resistance to relative motion of said links the closer the same approach dead-center relationship, the nut having a radial extension serving as a lever arm, said nut being fixed against turning by means of said extension to the link carrying said nut, the construction including a sheet metal cage removably secured to the link carrying said nut, said cage including opposed arms disposed on opposite sides of and embracing the nut extension and a portion of the link, the end portions of said arms being extended inwardly toward one another from opposite sides of the link to retain the cage and nut on said link and prevent turning of said nut relative to said link about said screw as an axis.

4. In a hinge comprising two generally rectangular butt members, and a pintle pivotally connecting the same at their one end, hold-open means for said hinge comprising a pair of toggle links having overlapping flat end portions in spaced parallel relationship, means pivotally connecting the other end of said links to the respective butt members intermediate their ends on axes parallel to said pintle, a screw carried on one of said overlapping end portions and having a head and a smooth cylindrical shank portion, the latter extending through and bearing in a circular hole provided in the other of said overlapping end portions for pivotally connecting said end portions, means holding said screw against turning relative to the link carrying it, said shank having a threaded outer end portion, a nut threaded thereon and fixed on the other of said links against turning relative thereto, whereby said overlapping end portions are drawn together by the tightening of said nut as said links are swung from folded position toward dead-center relationship in the opening of said hinge, and friction brake material compressible between the overlapping end portions of said links in the tightening of said nut to give increasing resistance to relative motion of said links the closer the same approach dead-center relationship, the link carrying the screw having a polygonal opening provided therein of smaller size than the head of the screw, and said screw having a polygonal portion on the shank next to the head non-rotatably received in said opening, the nut being detachable from the link carrying it, whereby to permit rotary adjustment of said nut, or rotary adjustment of said screw with respect to said nut to compensate for wear of the friction brake material, said nut having a radial extension serving as a lever arm to facilitate fastening of the said nut against turning, said nut being secured by means of said radial extension to the link carrying said nut.

References Cited in the file of this patent

UNITED STATES PATENTS

| | | |
|---|---|---|
| 926,520 | Thornton et al. | June 29, 1909 |
| 2,598,560 | Kenyon | May 27, 1952 |
| 2,771,628 | Hollansworth | Nov. 27, 1956 |
| 3,052,497 | Lohr | Sept. 4, 1962 |

FOREIGN PATENTS

| | | |
|---|---|---|
| 721,679 | Great Britain | Jan. 12, 1955 |